(12) United States Patent
Tanaka

(10) Patent No.: US 11,011,757 B2
(45) Date of Patent: May 18, 2021

(54) SEPARATOR FOR FUEL CELL, FUEL CELL, AND MANUFACTURING METHOD OF SEPARATOR FOR FUEL CELL

(71) Applicant: TOYOTA JIDOSHA KABUSHIKI KAISHA, Toyota (JP)

(72) Inventor: Hideaki Tanaka, Gotemba (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 213 days.

(21) Appl. No.: 16/050,426

(22) Filed: Jul. 31, 2018

(65) Prior Publication Data
US 2019/0044157 A1 Feb. 7, 2019

(30) Foreign Application Priority Data
Aug. 4, 2017 (JP) .............................. JP2017-152030

(51) Int. Cl.
| | | |
|---|---|---|
| *H01M 8/026* | (2016.01) | |
| *H01M 8/0206* | (2016.01) | |
| *H01M 8/0221* | (2016.01) | |
| *B32B 15/08* | (2006.01) | |
| *B32B 3/26* | (2006.01) | |
| *H01M 8/0213* | (2016.01) | |

(Continued)

(52) U.S. Cl.
CPC .......... *H01M 8/0221* (2013.01); *B32B 3/266* (2013.01); *B32B 15/08* (2013.01); *H01M 8/0202* (2013.01); *H01M 8/0206* (2013.01); *H01M 8/0213* (2013.01); *H01M 8/0228* (2013.01); *H01M 8/0254* (2013.01); *H01M 8/0258* (2013.01); *B32B 2255/06* (2013.01); *B32B 2307/202* (2013.01); *B32B 2457/18* (2013.01); *H01M 2008/1095* (2013.01)

(58) Field of Classification Search
CPC ................ B32B 15/08; B32B 2255/06; B32B 2307/202; B32B 2457/18; B32B 3/266; H01M 2008/1095; H01M 8/0202; H01M 8/0206; H01M 8/0213; H01M 8/0221; H01M 8/0228; H01M 8/0254; H01M 8/0258; Y02E 60/50; Y02P 70/50
See application file for complete search history.

(56) References Cited

U.S. PATENT DOCUMENTS

| | | |
|---|---|---|
| 6,490,778 B1 | 12/2002 | Funatsu et al. |
| 2006/0280992 A1 | 12/2006 | Miyagawa |

(Continued)

FOREIGN PATENT DOCUMENTS

| | | |
|---|---|---|
| CN | 1839501 A | 9/2006 |
| CN | 102082282 A | 6/2011 |

(Continued)

OTHER PUBLICATIONS

Machine translation of JP2006228638A (Year: 2020).*

*Primary Examiner* — Lingwen R Zeng
(74) *Attorney, Agent, or Firm* — Finnegan, Henderson, Farabow, Garrett & Dunner, LLP

(57) ABSTRACT

A separator for a fuel cell, includes: a metal plate; a first electro-conductive resin layer formed on a first surface side of the metal plate; a second electro-conductive resin layer formed on a second surface side of the metal plate opposite to the first surface side; and a flow channel in which the metal plate and the first and second electro-conductive resin layers have a wavy shape in cross section.

5 Claims, 8 Drawing Sheets

(51) Int. Cl.
    *H01M 8/0254*     (2016.01)
    *H01M 8/0258*     (2016.01)
    *H01M 8/0228*     (2016.01)
    *H01M 8/0202*     (2016.01)
    *H01M 8/1018*     (2016.01)

(56) References Cited

U.S. PATENT DOCUMENTS

| | | |
|---|---|---|
| 2007/0212589 A1 | 9/2007 | Kobuchi et al. |
| 2007/0298308 A1 | 12/2007 | Yamamoto et al. |
| 2010/0239957 A1 | 9/2010 | Yamamoto et al. |
| 2011/0123904 A1 | 5/2011 | Fujimura et al. |
| 2016/0064766 A1 | 3/2016 | Hashimoto et al. |
| 2016/0129491 A1 | 5/2016 | Taguchi et al. |

FOREIGN PATENT DOCUMENTS

| | | | |
|---|---|---|---|
| EP | 1 667 262 A1 | | 6/2006 |
| JP | 2003-297383 | | 10/2003 |
| JP | 2003-303597 | | 10/2003 |
| JP | 2005-293877 | | 10/2005 |
| JP | 2005-322433 A | | 11/2005 |
| JP | 2006-012712 | | 1/2006 |
| JP | 2006-120497 A | | 5/2006 |
| JP | 2006-228638 | | 8/2006 |
| JP | 2006228638 A | * | 8/2006 |
| JP | 2008-282728 A | | 11/2008 |
| JP | 2011-113806 A | | 6/2011 |
| JP | 4975262 B | | 7/2012 |
| JP | 2012-204118 | | 10/2012 |
| JP | 2016-110724 | | 6/2016 |

* cited by examiner

SEPARATOR FOR FUEL CELL, FUEL CELL, AND MANUFACTURING METHOD OF SEPARATOR FOR FUEL CELL

CROSS-REFERENCE TO RELATED APPLICATION

This application is based upon and claims the benefit of priority of the prior Japanese Patent Application No. 2017-152030, filed on Aug. 4, 2017, the entire contents of which are incorporated herein by reference.

FIELD OF THE INVENTION

The present invention relates to a separator for a fuel cell, a fuel cell, and a manufacturing method of a separator for a fuel cell.

BACKGROUND

There is known a fuel cell including a pair of separators sandwiching a membrane electrode gas diffusion layer assembly. Such a separator is formed with flow channels having a wavy shape in cross section. A reactant gas flows along the flow channels on the membrane electrode gas diffusion layer assembly side. A coolant flows on the side opposite to the flow channels. The membrane electrode gas diffusion layer assembly is sandwiched by the flow channels of the separators. In addition, there is known a separator including a metal plate and electro-conductive resin layers provided on respective surfaces of the metal plate. As for the flow channels, the metal plate and the electro-conductive resin layers are formed to have a wavy shape in cross section (see, for example, Japanese Unexamined Patent Application Publication No. 2003-297383).

As for the flow channels, the metal plate also has a wavy shape. Thus, a depth of the flow channel may partially increase an expansion amount of the metal plate and may decrease its thickness in processing, which may decrease its stiffness. In addition, if the depth of the flow channel is formed to be shallow in order to suppress such a decrease in stiffness of the metal plate, the pressure loss of the reactant gas and the coolant flowing along the flow channels may increase. Further, if a width of the flow channel is increased while ensuring the depth thereof in order to suppress the decrease in stiffness of the metal plate as described above, the membrane electrode gas diffusion layer assembly might not be sandwiched at a suitable interval. This might decrease an area of a membrane electrode assembly on which sufficient sandwiching force exerts, so that the membrane electrode assembly might repeatedly swell and expand in the area on which small sandwiching force exerts, and its strength might decrease.

SUMMARY OF THE INVENTION

It is therefore an object of the present invention to provide a separator for a fuel cell, a fuel cell having the same, and a manufacturing method of the same in which a decrease in stiffness of a metal plate is suppressed without influence on a width and a depth of a flow channel.

The above object is achieved by a separator for a fuel cell, including: a metal plate; a first electro-conductive resin layer formed on a first surface side of the metal plate; a second electro-conductive resin layer formed on a second surface side of the metal plate opposite to the first surface side; and a flow channel in which the metal plate and the first and second electro-conductive resin layers have a wavy shape in cross section, wherein the flow channel includes: a first convex portion projecting to the first surface side; a second convex portion projecting to the second surface side as compared with the first convex portion; a side portion positioned between the first and second convex portions; a first outer surface of the first electro-conductive resin layer opposite to the metal plate; and a second outer surface of the second, electro-conductive resin layer opposite to the metal plate, the first convex portion of the metal plate is closer to the second outer surface than the first outer surface, and the second convex portion of the metal plate is closer to the first outer surface than the second outer surface.

The metal plate in the first convex portion is closer to the second outer surface than the first outer surface, and the metal plate in the second convex portion is closer to the first outer surface than the second outer surface. This suppresses an expansion amount of the side portion between the first and second convex portions, which suppresses a decrease in stiffness of the metal plate without influence on a width and a depth of the flow channel.

The first convex portion of the metal plate may be distant from the first outer surface by the thickness of the metal plate or more, and the second convex portion of the metal plate may be distant from the second outer surface by the thickness of the metal plate or more.

The flow channel may include: a first curved portion curved between the side portion and the first convex portion; and a second curved portion curved between the side portion and the second convex portion, in the first curved portion, a curvature of the metal plate may be smaller than that of the first outer surface, and in the second curved portion, a curvature of the metal plate may be smaller than that of the second outer surface.

A shape of the first outer surface in the first convex portion may be flat, and a shape of the second outer surface in the second convex portion may be flat.

An average thickness of the second electro-conductive resin layer in the first convex portion may be equal to or less than 40 percent of a total value of an average thickness of the first electro-conductive resin layer in the first convex portion and an average thickness of the second electro-conductive resin layer in the first convex portion, and an average thickness of the first electro-conductive resin layer in the second convex portion may be equal to or less than 40 percent of a total value of an average thickness of the first electro-conductive resin layer in the second convex portion and an average thickness of the second electro-conductive resin layer in the second convex portion.

A ratio of a thickness of the metal plate to a total thickness of the metal plate and the first and second electro-conductive resin layers may be equal to or less than 50 percent.

A ratio of a distance, from the metal plate in the second convex portion to the metal plate in the first convex portion in a thickness direction, to a distance, from the first outer surface in the second convex portion to the first outer surface in the first convex portion, may be equal to or less than 95 percent.

The above object is also achieved by a fuel cell including: first and second separators; and a membrane electrode gas diffusion layer assembly positioned between the first and second separators, wherein at least one of the first and second separators includes: a metal plate; a first electro-conductive resin layer formed on a first surface side of the metal plate; a second electro-conductive resin layer formed on a second surface side of the metal plate opposite to the first surface side; and a wavy portion defining a flow channel in which the metal plate and the first and second electro-conductive resin layers have a wavy shape in cross section, the wavy portion includes: a first convex portion projecting to the first surface side; a second convex portion projecting to the second surface side as compared with the first convex portion; a side portion positioned between the first and second convex portions; a first outer surface of the first electro-conductive resin layer opposite to the metal plate; and a second outer surface of the second electro-conductive resin layer opposite to the metal plate, the first convex portion of the metal plate is closer to the second outer surface than the first outer surface, and the second convex portion of the metal plate is closer to the first outer surface than the second outer surface.

The above object is also achieved by a manufacturing method of a separator for a fuel cell, including: preparing a metal plate, a first electro-conductive resin layer, and a second electro-conductive resin layer; forming a wavy portion by pressing the metal plate and the first and second electro-conductive resin layers, wherein the first electro-conductive resin layer is formed on a first surface side of the metal plate; the second electro-conductive resin layer is formed on a second surface side of the metal plate opposite to the first surface side; the wavy portion defines a flow channel in which the metal plate and the first and second electro-conductive resin layers have a wavy shape in cross section; the wavy portion includes: a first convex portion projecting to the first surface side; a second convex portion projecting to the second surface side as compared with the first convex portion; a side portion positioned between the first and second convex portions; a first outer surface of the first electro-conductive resin layer opposite to the metal plate; and a second outer surface of the second electro-conductive resin layer opposite to the metal plate, the first convex portion of the metal plate is closer to the second outer surface than the first outer surface; and the second convex portion of the metal plate is closer to the first outer surface than the second outer surface.

DETAILED DESCRIPTION

Figure 1:
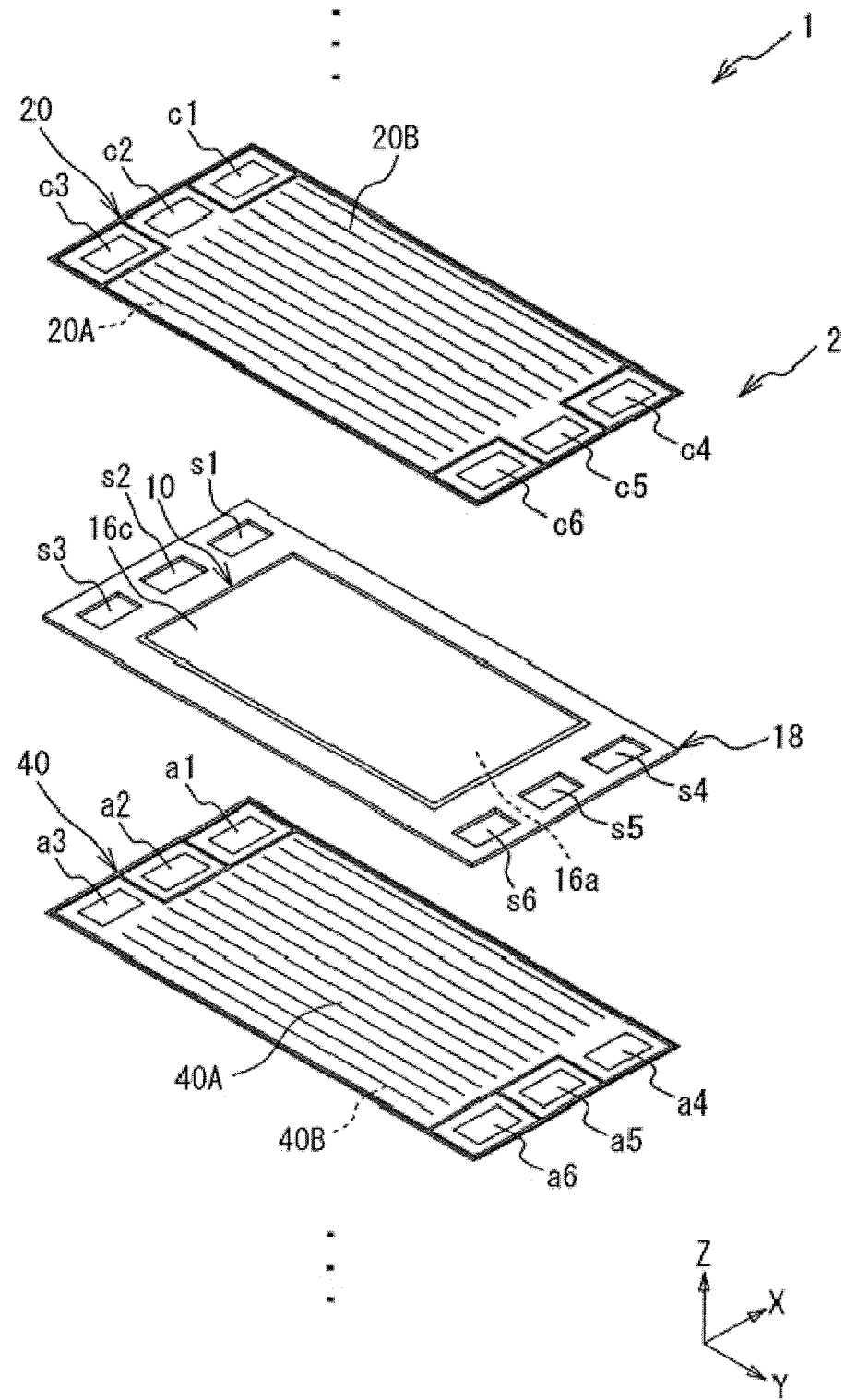
FIG. 1 is an exploded perspective view of a unit cell of a fuel cell.

FIG. 1 is an exploded perspective view of a unit cell 2 of a fuel cell 1. The fuel cell 1 is configured by stacking unit cells 2. FIG. 1 illustrates only one unit cell 2, and omits other unit cells. The unit cell 2 is stacked with other unit cells in the Z direction illustrated in FIG. 1. The unit cell 2 has a substantially rectangular shape. The longitudinal direction and the short direction of the unit cell 2 correspond to the Y direction and the X direction illustrated in FIG. 1, respectively.

The fuel cell 1 is a polymer electrolyte fuel cell that generates electric power with a fuel gas (for example, hydrogen) and an oxidant gas (for example, oxygen) as reactant gases. The unit cell 2 includes: a membrane electrode gas diffusion layer assembly 10 (hereinafter referred to as MEGA (Membrane Electrode Gas diffusion layer Assembly)); a support frame 18 supporting the MEGA 10; a cathode separator 20 and an anode separator 40 (hereinafter referred to as separators) sandwiching the MEGA 10. The MEGA 10 has a cathode gas diffusion layer 16c and an anode gas diffusion layer 16a (hereinafter referred to as diffusion layers). The support frame 18 has a substantially frame shape, and its inner peripheral side is joined to a peripheral region of the MEGA 10.

Holes c1 to c3 are formed along one of two short sides of the separator 20, and holes c4 to c6 are formed along the other side. Likewise, holes s1 to s3 are formed along one side of two short sides of the support frame 18, and holes s4 to s6 are formed along the other side. Likewise, holes a1 to a3 are formed along one side of two short sides of the separator 40, and holes a4 to a6 are formed along the other side. The holes c1, s1, and a1 communicate with one another to define a cathode inlet manifold. Likewise, the holes c2, s2, and a2 define a coolant inlet manifold. The holes c3, s3, and a3 define an anode outlet manifold. The holes c4, s4, and a4 define an anode inlet manifold. The holes c5, s5, and a5 define a coolant outlet manifold. The holes c6, s6, and a6 define a cathode outlet manifold. In the fuel cell 1 according to the present embodiment, liquid cooling water is used as a coolant.

A surface of the separator 40 facing the MEGA 10 is formed with anode flow channels 40A (hereinafter referred to as flow channels) which communicate the anode inlet manifold with the anode outlet manifold and along which the fuel gas flows. The surface of the separator 20 facing the MEGA 10 is formed with cathode flow channels 20A (hereinafter referred to as flow channels) which communicate the cathode inlet manifold with the cathode outlet manifold and along which the oxidant gas flows. The surface of the separator 40 opposite to the flow channels 40A and the surface of the separator 20 opposite to the flow channels 20A are respectively formed with coolant flow channels 20B and 40B (hereinafter referred to as flow channels) which communicate the coolant inlet manifold with the coolant outlet manifold and along which the coolant flows. The flow channels 20A and 20B extend in the longitudinal direction of the separator 20 (Y direction). Likewise, the flow channels 40A and 40B extend in the longitudinal direction of the separator 40 (Y direction).

Figure 2:
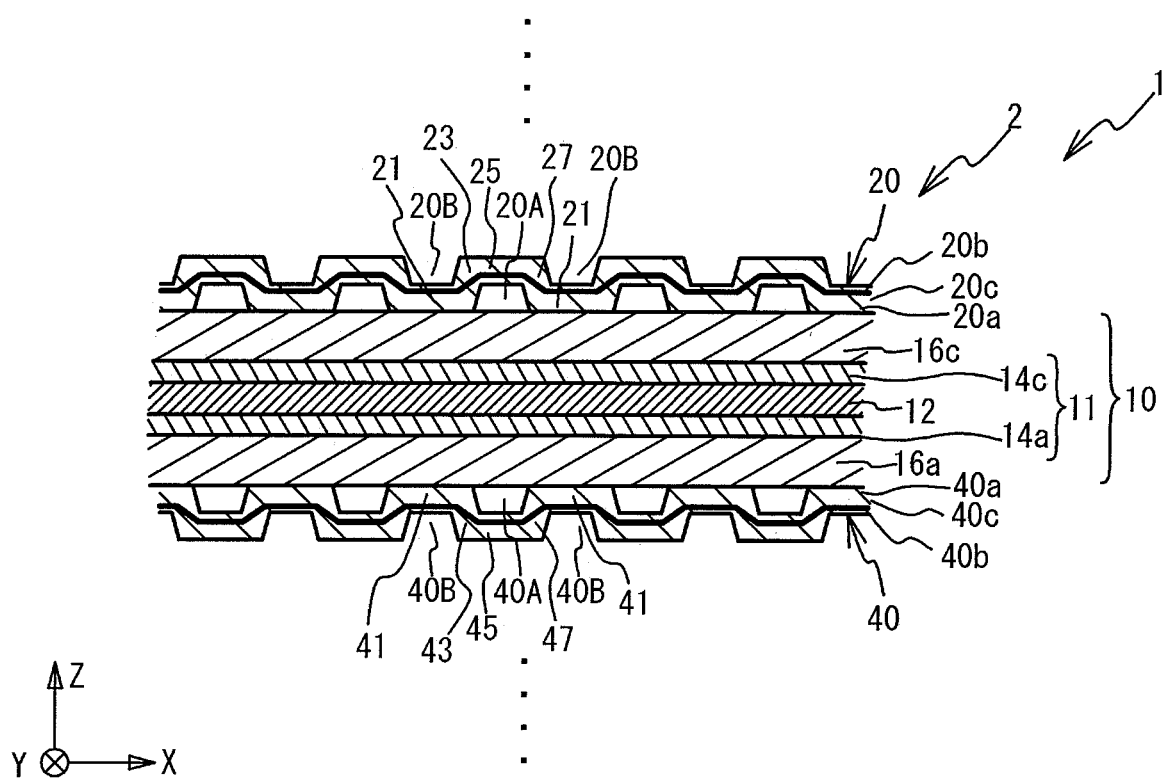
FIG. 2 is a partially cross-sectional view of the fuel cell where the unit cells are stacked.

FIG. 2 is a partially cross-sectional view of the fuel cell 1 where the unit cells 2 are stacked. FIG. 2 illustrates only one unit cell 2, and omits the other unit cells. FIG. 2 illustrates a cross section orthogonal to the Y direction.

The MEGA 10 includes the diffusion layers 16a and 16c, and a membrane electrode assembly (hereinafter referred to as MEA (Membrane Electrode Assembly)) 11. The MEA 11 includes an electrolyte membrane 12, and an anode catalyst layer 14a and a cathode catalyst layer 14c (hereinafter referred to as catalyst layers) formed on one surface and the other surface of the electrolyte membrane 12, respectively. The electrolyte membrane 12 is a solid polymer thin film, such as a fluorine-based ion exchange membrane, with high proton conductivity in a wet state. The catalyst layers 14a and 14c are made by coating a catalyst ink containing a carbon support carrying platinum (Pt) or the like and an ionomer having proton conductivity on the electrolyte membrane 12. The diffusion layers 16a and 16c are made of a material having gas permeability and conductivity, for example, a porous fiber base material such as carbon fiber or graphite fiber. The diffusion layers 16a and 16c are joined to the catalyst layers 14a and 14c, respectively.

The separator 20 includes: a metal plate 20c; an electro-conductive resin layer 20a (hereinafter, simply referred to as resin layer) formed on the diffusion layer 16c side of the metal plate 20c; and an electro-conductive resin layer 20b (hereinafter simply referred to as a resin layer) formed on the opposite side to the diffusion layer 16c of the metal plate 20c. A material of the metal plate 20c is not particularly limited, but can be stainless steel, titanium, aluminum, iron, copper, or the like. The resin layers 20a and 20b are made by dispersing conductive particles in a resin binder. The conductive particles can be appropriately selected from, for example, carbon, metal particles having conductivity such as stainless steel, titanium, and gold, and combination thereof. The resin binder can be appropriately selected from thermosetting resins such as epoxy and phenol, thermoplastic resins such as polypropylene, polyethylene, polyethylene naphthalate, and combination thereof. At least one of the resin layers 20a and 20b may further contain a hardening accelerator or a release agent such as fluorine. The metal plate 20c is covered with such resin layers 20a and 20b. This ensures the entire conductivity of the separator 20 and suppresses a decrease in corrosion resistance of the metal plate 20c. Also, the use of the metal plate 20c ensures the entire stiffness of the separator 20. The resin layer 20a is an example of a first electro-conductive resin layer formed on a first surface side of the metal plate 20c. The resin layer 20b is an example of a second electro-conductive resin layer formed on a second surface side opposite to the first surface of the metal plate 20c.

Likewise, the separator 40 includes: a metal plate 40c; an electro-conductive resin layer 40a (hereinafter, simply referred to as resin layer) formed on the diffusion layer 16a side of the metal plate 40c; and an electro-conductive resin layer 40b (hereinafter, simply referred to as a resin layer) formed on the opposite side to the diffusion layer 16a of the metal plate 40c. The resin layers 40a and 40b are also examples of first and second electro-conductive resin layers respectively formed on first and second surface sides of the metal plate 40 c. The separator 20 will be described below in detail. A detailed description of the separator 40 will be omitted, since the separator 40 is substantially the same as the separator 20.

The flow channels 20A, 20B, 40A, and 40B have a wavy shape in cross section when viewed in the Y direction. Also, the resin layers 20a, 20b, 40a, and 40b and the metal plates 20c and 40c have a wavy shape in cross section. The flow channels 20A and 20B are defined by a convex portion 21, a side portion 23, a convex portion 25, a side portion 27, and a convex portion 21 . . . continuously repeated in the X direction, that is, in the direction in which the flow channels 20A and 20B are arranged. The convex portion 21 projects to the diffusion layer 16c so as to contact the diffusion layer 16c. The convex portion 25 does not contact the diffusion layer 16c and projects to the side opposite to the diffusion layer 16c. The side portion 23 is continuous and inclined between the convex portion 21 and the convex portion 25 away from the convex portion 21 in the +X direction. The side portion 27 is continuous and inclined between the convex portion 25 and the convex portion 21 away from the convex portion 25 in the +X direction.

A space surrounded by the side portion 23, the convex portion 25, and the side portion 27 is defined as the flow channel 20A of the separator 20 on the diffusion layer 16c side. Further, the convex portion 25 contact an anode separator of another unit cell not illustrated adjacent to the upper side of the unit cell 2 illustrated in FIG. 2. On the anode separator side not illustrated, a space surrounded by the convex portion 21 and the side portions 23 and 27 is defined as the flow channel 20B of the separator 20. In this way, the flow channels 20A and 20B are integrally formed respectively on the side and the other side of the separator 20. The flow channels 20A and 20B are an example of flow channels formed by pressing the metal plate 20c and the resin layers 20a and 20b.

Likewise, the flow channels 40A and 40B are defined by a convex portion 41, a side portion 43, a convex portion 45, a side portion 47, and a convex portion 41 . . . continuously repeated in the X direction. The convex portion 41 projects to the diffusion layer 16a so as to contact the diffusion layer 16a. The convex portion 45 does not contact the diffusion layer 16a and projects to the side opposite to the diffusion layer 16a. The side portion 43 is continuous and inclined between the convex portion 41 and the convex portion 45 away from the convex portion 41 in the +X direction. The side portion 47 is continuous and inclined between the convex portion 45 and the convex portion 41 away from the convex portion 45 in the +X direction.

A space surrounded by the side portion 43, the convex portion 45, and the side portion 47 is defined as the flow channel 40A of the separator 40 on the diffusion layer 16a side. Further, the convex portion 45 contact a cathode separator of another unit cell not illustrated adjacent to the lower side of the unit cell 2 illustrated in FIG. 2. On the cathode separator side not illustrated, a space surrounded by the convex portion 41 and the side portions 43 and 47 is defined as the flow channel 40B of the separator 40. In this way, the flow channels 40A and 40B are integrally formed respectively on the side and the other side of the separator 40. The flow channels 40A and 40B are example of flow channels formed by pressing the metal plate 40c and the resin layers 40a and 40b.

Figure 3:
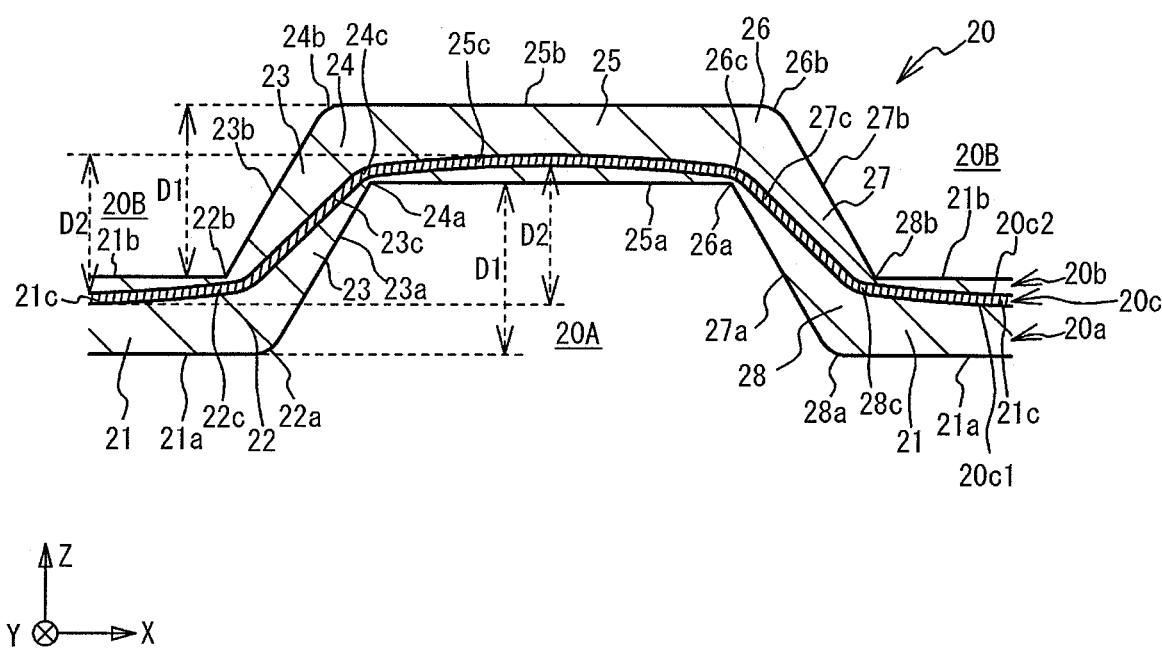
FIG. 3 is a partially enlarged view of a separator.

FIG. 3 is a partially enlarged view of the separator 20. The metal plate 20c has a surface 20c1 and a surface 20c2 opposite thereto. The surfaces 20c1 and 20c2 are respectively coated with the resin layers 20a and 20b. The surfaces 20c1 and 20c2 are examples of first and second surfaces, respectively. The convex portions 21 and 25 are examples of first and second convex portions projecting to the surface 20c1 side and the surface 20c2 side of the metal plate 20c, respectively. Additionally, the separator 20 has curved portions 22, 24, 26, and 28 without reference numerals in FIG. 2. The curved portion 22 is curved between the convex portion 21 and the side portion 23. Likewise, the curved portion 24 is curved between the side portion 23 and the convex portion 25. The curved portion 26 is curved between the convex portion 25 and the side portion 27. The curved portion 28 is curved between the side portion 27 and the convex portion 21. The curved portion 22 is an example of a first curved portion curved between the side portion 23 and the convex portion 21. The curved portion 28 is an example of a first curved portion curved between the side portion 27 and the convex portion 21. The curved portion 24 is an example of a second curved portion curved between the side portion 23 and the convex portion 25. The curved portion 26 is an example of a second curved portion curved between the side portion 27 and the convex portion 25. The entire thickness of the separator 20 is substantially uniform at each position. The convex portions 21 and 25 are substantially parallel to each other in the X direction and each has a substantially linear shape. The side portion 23 is inclined between the +X direction and the +Z direction from the convex portion 21 in the +X direction and has a substantially linear shape. The side portion 27 is inclined between the +X direction and the −Z direction from the convex portion 25 in the +X direction and has a substantially linear shape.

Herein, outer surfaces of the resin layers 20a and 20b at the convex portion 21, at the curved portion 22, at the side portion 23, at the curved portion 24, at the convex portion 25, at the curved portion 26, at the side portion 27, and at the curved portion 28 are respectively defined as a convex surface 21a and a concave surface 21b, as a curved surfaces 22a and 22b, as side surfaces 23a and 23b, as curved surfaces 24a and 24b, as a concave surface 25a and a convex surface 25b, as curved surfaces 26a and 26b, as side surfaces 27a and 27b, and as curved surfaces 28a and 28b. The convex surface 21a, the curved surface 22a, the side surface 23a, the curved surface 24a, the concave surface 25a, the curved surface 26a, the side surface 27a, and the curved surface 28a are an example of a first outer surface of the resin layer 20a opposite to the metal plate 20c. The concave surface 21b, the curved surface 22b, the side surface 23b, the curved surface 24b, the convex surface 25b, the curved surface 26b, the side surface 27b, and the curved surface 28b are examples of a second outer surface of the resin layer 20b opposite to the metal plate 20c. Regions of the metal plate 20c at the convex portion 21, at the curved portion 22, at the side portion 23, at the curved portion 24, at the convex portion 25, at the curved portion 26, at the side portion 27, and at the curved portion 28 are respectively defined as a convex region 21c, as a curved region 22c, as a side region 23c, as a curved region 24c, as a convex region 25c, as a curved region 26c, as a side region 27c, and as a curved region 28c.

The convex surfaces 21a and 25b and the concave surfaces 21b and 25a are substantially parallel to one another in the X direction. The side surfaces 23a and 23b are substantially parallel to each other. The convex surfaces 21a and 25b are respectively positioned near the surfaces 20c1 and 20c2 sides of the metal plate 20c. Further, the concave surface 21b is positioned closer to the surface 20c1 side of the metal plate 20c than the concave surface 25a, which ensures each depth of the flow channels 20A and 20B described later. The side surfaces 27a and 27b are substantially parallel to each other. The side surfaces 23a and 23b and the side surfaces 27a and 27b are substantially symmetrical with respect to a plane perpendicular to the X axis passing through the convex portion 25. The convex surfaces 21a and 25b and the concave surfaces 21b and 25a are flat. However, the convex region 21c positioned between the convex surface 21a and the concave surface 21b is curved so as to slightly project in the −Z direction, in other words, toward the surface 20c1. On the other hand, the convex region 25c positioned between the concave surface 25a and the convex surface 25b is curved so as to slightly project in the +Z direction, in other words, toward the surface 20c2.

The side surfaces 23a, 23b, 27a, and 27b are also flat, but are not limited thereto. Each of an exterior angle of the separator 20 between the convex surface 21a and the side surface 23a, an exterior angle of the separator 20 between the side surface 23b and the convex surface 25b, an exterior angle of the separator 20 between the convex surface 25b and the side surface 27b, and an exterior angle of the separator 20 between the side surface 27a and the convex surface 21a is set to be greater than 180 degrees and not greater than 270 degrees. Each of an exterior angle of the separator 20 between the concave surface 21b and the side surface 23b, an exterior angle of the separator 20 between the side surface 23a and the concave surface 25a, an exterior angle of the separator 20 between the concave surface 25a and the side surface 27a, and an exterior angle of the separator 20 between the side surface 27b and the concave surface 21b is set to be 90 degrees or more and less than 180 degrees.

The convex region 21c of the metal plate 20c is positioned distant from the convex surface 21a by the thickness of the convex region 21c or more, and closer to the concave surface 21b than the convex surface 21a. Also, the convex region 25c of the metal plate 20c is positioned distant from the convex surface 25b by the thickness of the convex region 25c or more, and closer to the concave surface 25a than the convex surface 25b. In other words, at the convex portion 21, the resin layer 20b is thinner than the resin layer 20a. In the convex portion 25, the resin layer 20a is thinner than the resin layer 20b. Therefore, as compared with a distance D1 from the convex surface 21a to the concave surface 25a in the Z direction corresponding to the depth of the flow channel 20A, a distance D2 from the convex region 21c to the convex region 25c in the Z direction corresponding to the depth of the metal plate 20c is short. Additionally, the distance D2 is specifically the distance in the Z direction from the center of the convex region 21c in the X direction to the center of the convex region 25c in the X direction. The distance D1 is substantially the same as the distance from the concave surface 21b to the convex surface 25b in the Z direction corresponding to the depth of the flow channel 20B. Additionally, in the case where at least one of the concave surface 21b and the convex surface 25b is flat, the distance D1 is an average value of the distance from the concave surface 21b to the convex surface 25b in the Z direction.

Herein, the separator 20 is formed by pressing as described above, and the metal plate 20c illustrated in FIG. 3 is also formed by pressing as will be described later. In the pressing, the convex regions 21c and 25c are deformed so as to be separated from each other in the Z direction while being substantially parallel to each other. Therefore, a large distance between the convex regions 21c and 25c in the Z direction might increase each expansion amount of the side regions 23c and 27c and decrease each thickness of the side regions 23c and 27c, which might decrease the stiffness of the metal plate 20c. However, in this embodiment, the convex region 21c is closer to the concave surface 21b than the convex surface 21a, and the convex region 25c is closer to the concave surface 25a than the convex surface 25b. This suppresses an increase in each expansion amount of the side regions 23c and 27c. Also this suppresses a decrease in each thickness of the side regions 23c and 27c, thereby suppressing a decrease in stiffness of the metal plate 20c.

Moreover, this eliminates the necessity of making the flow channels 20A and 20B shallow in order to suppress each expansion amount of the side regions 23c and 27c. This suppresses an increase in pressure loss of the oxidant gas and the coolant respectively flowing along the flow channels 20A and 20B. This also suppresses a decrease in power generation efficiency of the fuel cell 1 and suppresses a decrease in cooling efficiency. Further, this eliminates the necessity of widening the flow channels 20A and 20B while securing the depths thereof in order to suppress each expansion amount of the side regions 23c and 27c. It is therefore possible to sandwich the MEGA 10 at a suitable interval.

This also suppresses a decrease in strength of the MEA 11 due to repetition of swell, expansion, and contraction thereof.

The curved regions 22c, 24c, 26c, and 28c each has a curvature comparatively greater than the other regions of the metal plate 20c. As illustrated in FIG. 3, the curved region 22c is closer to the curved surface 22b than the curved surface 22a. The curved region 24c is closer to the curved surface 24a than the curved surface 24b. The curved region 26c is closer to the curved surface 26a than the curved surface 26b. The curved region 28c is closer to the curved surface 28b than the curved surface 28a. Thus, the gradient with respect to the X direction is gentler in the side region 23c than in each of the side surfaces 23a and 23b. Likewise, the gradient with respect to the X direction is gentler in the side region 27c than in each of the side surfaces 27a and 27b. Thus, the curvature of the curved region 22c is smaller than each curvature of the curved surfaces 22a and 22b. Similarly, the curvature of the curved region 24c is smaller than each curvature of the curved surfaces 24a and 24b, and the curvature of the curved region 26c is smaller than each curvature of the curved surfaces 26a and 26b. The curvature of the curved region 28c is smaller than each curvature of the curved surface 28a and 28b. As described above, the curvatures of the regions tending to be relatively greater than those of the other regions of the metal plate 20c is suppressed. Herein, a great curvature of each region of the metal plate might decrease its stiffness. On the other hand, the curvature of the metal plate 20c according to the present embodiment is suppressed as described above. This suppresses a decrease in stiffness of the metal plate 20c.

The convex surface 25b is flat as described above, thereby ensuring the contact area between the convex surface 25b of the separator 20 and the separator of the other unit cell adjacent to the separator 20. This suppresses an increase in electric resistance between the separator 20 and the separator of the other adjacent unit cell. Further, each curvature of the curved surfaces 24b and 26b adjacent to the convex surface 25b is greater than each curvature of the curved regions 24c and 26c. Herein, when each curvature of the curved surfaces 24b and 26b adjacent to the convex surface 25b is small, the curved surfaces 24b and 26b are gently curved. Thus, the flat area at the convex surface 25b is reduced accordingly. In the present embodiment, each curvature of the curved surfaces 24b and 26b adjacent to the convex surface 25b is greater than each curvature of the curved regions 24c and 26c. Therefore, the flat area of the convex surface 25b is ensured. This also ensures a contact area with the separator of the adjacent unit cell and suppresses an increase in electrical resistance between the separators.

Likewise, the convex surface 21a is also flat, and each curvature of the curved surfaces 22a and 28a adjacent to the convex surface 21a is greater than that of the curved regions 22c and 28c. This can ensure the contact area between the convex surface 21a of the separator 20 and the diffusion layer 16c. It is therefore possible to stably hold the MEGA 10 between the separators 20 and 40. This can hold the MEA 11 with sufficient sandwiching force. It is thus possible to suppress a decrease in strength of the MEA 11 due to repetition of swell, expansion, and contraction in a region thereof on which insufficient sandwiching force exerts.

Although not particularly limited thereto, the average thickness of the resin layer 20b at the convex portion 21 is 40% or less, and preferably 30% or less of the total value of the average thickness of the resin layer 20a at the convex portion 21 and the average thickness of the resin layer 20b thereat. The average thickness of the resin layer 20a at the convex portion 25 is 40% or less, and preferably 30% or less of the total value of the average thickness of the resin layer 20a at the convex portion 25 and the average thickness of the resin layer 20b thereat. This is because an increase in expansion amount of the side region 23c can be suppressed when the convex region 21c is closer to the concave surface 21b and the convex region 25c is closer to the concave surface 25a.

Herein, the average thickness of the resin layer 20a at the convex portion 21 is specifically an average of the distance from the surface 20c1 of the convex region 21c to the convex surface 21a within the convex portion 21 in the Z direction. Similarly, the average thickness of the resin layer 20b at the convex portion 21 is an average of the distance from the surface 20c2 of the convex region 21c to the concave surface 21b within the convex portion 21 in the Z direction. The average thickness of the resin layer 20a at the convex portion 25 is an average of the distance from the surface 20c1 of the convex region 25c to the concave surface 25a within the convex portion 25 in the Z direction. The average thickness of the resin layer 20b at the convex portion 25 is an average of the distance from the surface 20c2 of the convex region 25c to the convex surface 25b within the convex portion 25 in the Z direction.

For example, when the average thickness of the resin layer 20b at the convex portion 21 is 40 μm and when the average thickness of the resin layer 20a at the convex portion 21 is 60 μm, the average thickness of the resin layer 20b is 40% of the total value of the average thickness of the resin layer 20a and the average thickness of the resin layer 20b. As another example, when the average thickness of the resin layer 20b at the convex portion 21 is 30 μm and when the average thickness of the resin layer 20a at the convex portion 21 is 70 μm, the average thickness of the resin layer 20b is 30% of the total value of the average thickness of the resin layer 20a and the average thickness of the resin layer 20b. The average thickness of the resin layer 20b at the convex portion 21 may be sufficient as long as it covers the metal plate 20c. For example, this is 5% of the total value of the average thickness of the resin layer 20a and the average of the resin layer 20b. This also applies to the average thickness of the resin layer 20a at the convex portion 25.

The ratio of the thickness of the metal plate 20c to the total thickness of the resin layers 20a and 20b and the metal plate 20c is not particularly limited, but is preferably set to 50% or less, more preferably 35% or less. As the thickness of the metal plate 20c is smaller relative to the total thickness of the resin layers 20a and 20b and the metal plate 20c, the thickness of the resin layers 20a and 20b is relatively greater, so that an increase in each curvature of the curved region 22c and the curved region 24c can be suppressed. For example, when the total thickness of the resin layers 20a and 20b and the metal plate 20c is 200 μm and when the thickness of the metal plate 20c is 100 μm, a ratio of the thickness of the metal plate 20c to the total thickness of the resin layers 20a and 20b and the metal plate 20c is 50%. As another example, when the total thickness of the resin layers 20a and 20b and the metal plate 20c is 150 μm and when the thickness of the metal plate 20c is 50 μm, a ratio of the thickness of the metal plate 20c to the total thickness of the resin layers 20a and 20b and the metal plate 20c is 33.3%. The thickness of the metal plate 20c may be sufficient as long as it ensures the gas seal between both surfaces of the separator. The ratio of the thickness of the metal plate 20c to the total thickness of the resin layers 20a and 20b and the metal plate 20c may be, for example, 15%.

The distance D2 is, not particularly limited, preferably 95% or less of the distance D1, and more preferably 90% or less. This is because it is possible to ensure each depth of the flow channels 20A and 20B and suppress an increase in each extension amount of the side regions 23c and 27c. As an example, when the distance D1 is 400 μm and the distance D2 is 380 μm, the distance D2 is 95% of the distance D1. As another example, when the distance D1 is 300 μm and the distance D2 is 270 μm, the distance D2 is 90% of the distance D1.

Further, as for the metal plate 20c, the convex region 21c is curved so as to slightly project to the surface 20c1, and the convex region 25c is curved so as to slightly project to the surface 20c2. This suppresses an increase in each curvature of the curved regions 22c, 24c, 26c, and 28c.

Figure 4:
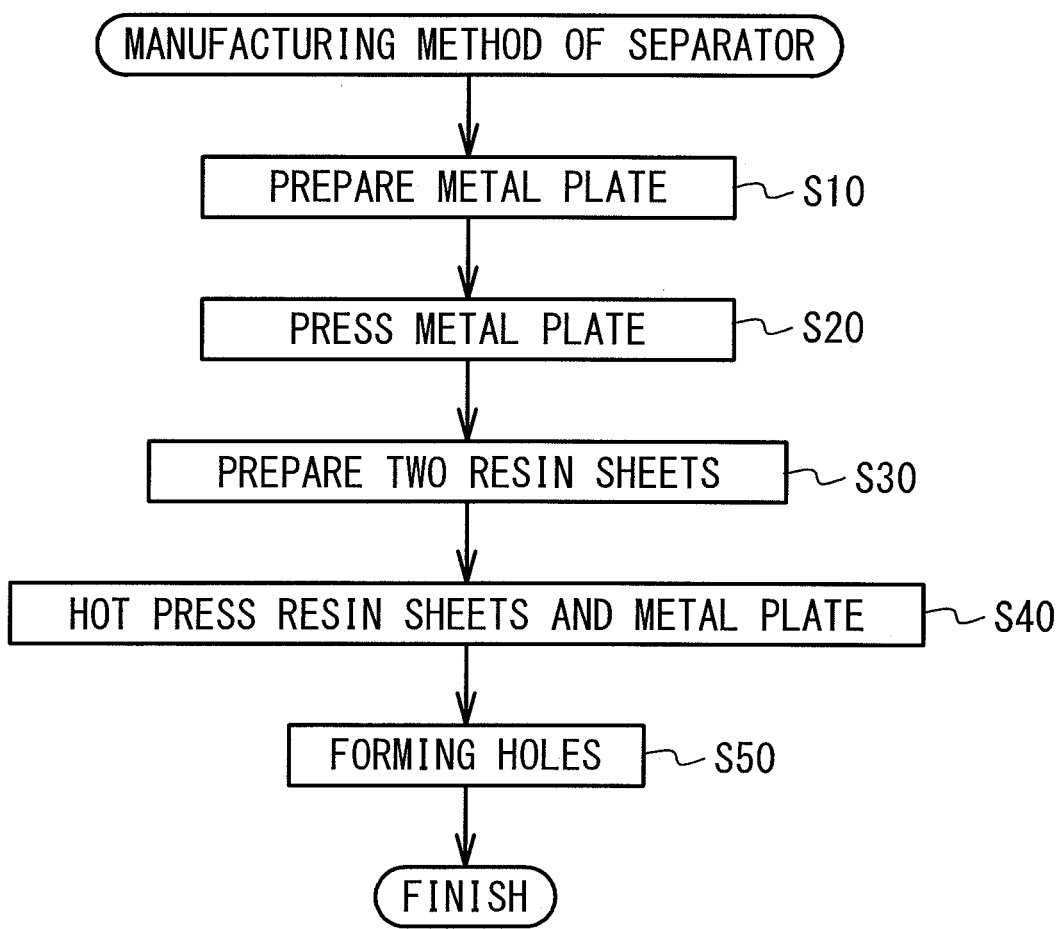
FIG. 4 is a flowchart illustrating a manufacturing method of the separator.
Figure 5A:
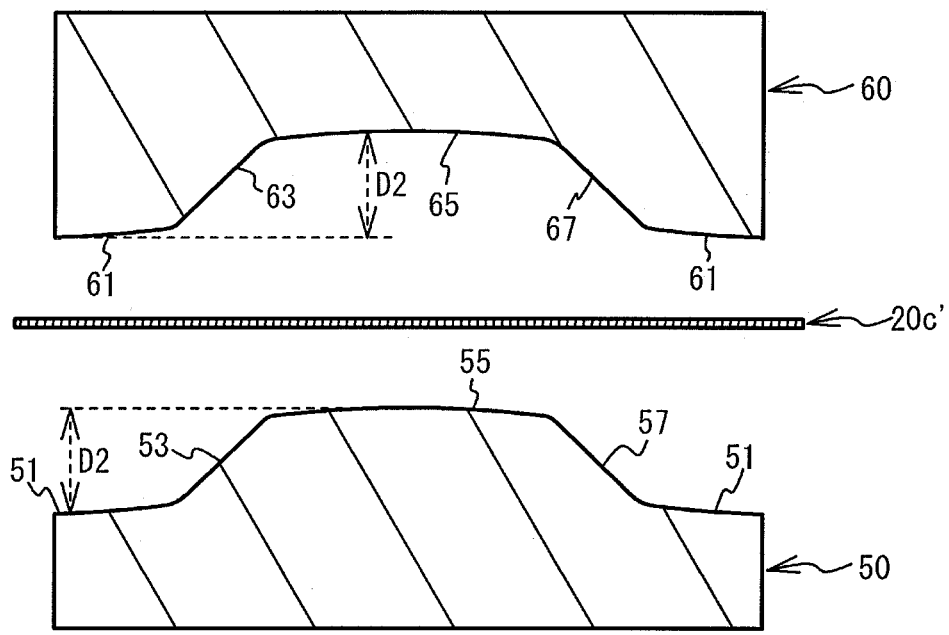
FIGS. 5A and 5B are explanatory views of the manufacturing method of the separator.
Figure 5A:
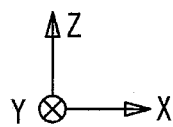
Figure 5B:
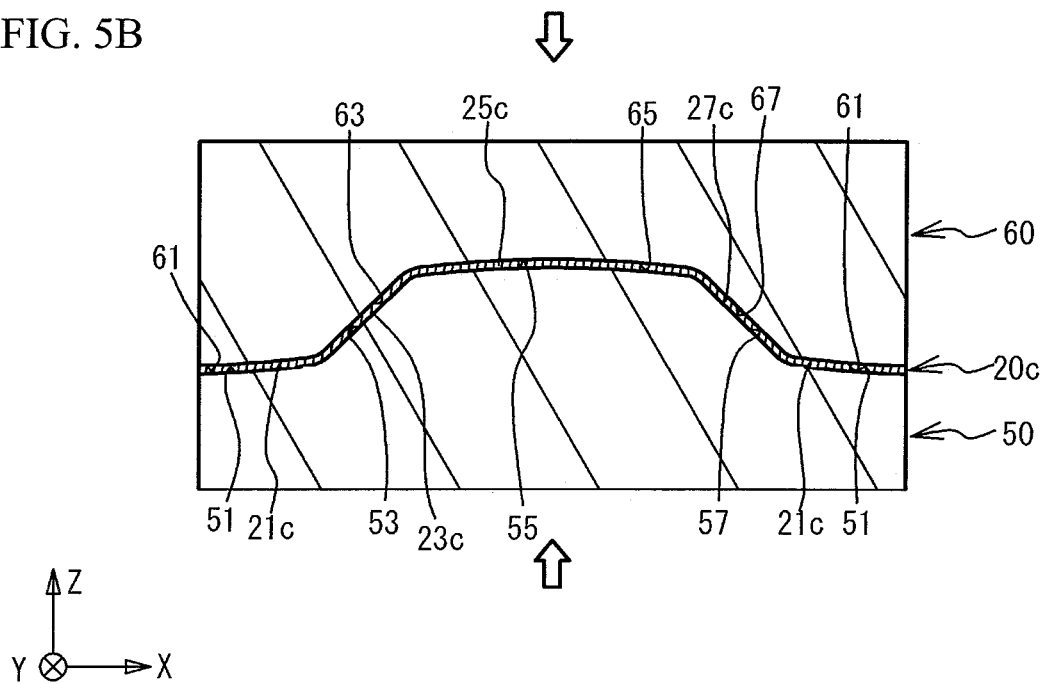

Next, a manufacturing method of the separator 20 will be described. FIG. 4 is a flowchart illustrating the manufacturing method of the separator 20. FIGS. 5A to 6B are explanatory views of the manufacturing method of the separator 20. The separator 20 is manufactured by pressing as described above. FIGS. 5A to 6B illustrate a partially enlarged cross section of dies used for pressing. First, a metal plate 20c' having a flat shape is prepared (step S10). The metal plate 20c' corresponds to the metal plate 20c of the completed separator 20. Next, as illustrated in FIGS. 5A and 5B, the metal plate 20c' is pressed by dies 50 and 60 (step S20). FIGS. 5A and 5B illustrate only parts of the dies 50 and 60, but actually the shapes illustrate in FIGS. 5A and 5B are continuously formed in the X direction.

At the metal plate 20c' side of the die 50, a concave surface 51, a side surface 53, a convex surface 55, a side surface 57, a concave surface 51 . . . are formed in this order in the X direction. The convex surface 55 projects toward the metal plate 20c' from the concave surface 51, and the concave surface 51 recedes from the metal plate 20c' with respect to the convex surface 55. The concave surface 51 is curved to slightly project oppositely to the metal plate 20c'. The convex surface 55 is curved to slightly project to the metal plate 20c'. A distance D2 between the concave surface 51 and the convex surface 55 in the Z direction is the same as the distance D2 illustrated in FIG. 3. The side surface 53 is inclined and positioned between the concave surface 51 and the convex surface 55 away from the concave surface 51 in the +X direction. The side surface 57 is inclined and positioned between the convex surface 55 and the concave surface 51 away from the convex surface 55 in the +X direction.

At the metal plate 20c' side of the die 60, a convex surface 61, a side surface 63, a concave surface 65, a side surface 67, a convex surface 61 . . . are formed in this order in the X direction. The concave surface 65 recedes from the metal plate 20c' with respect to the convex surface 61, and the convex surface 61 projects to the metal plate 20c' with respect to the concave surface 65. The convex surface 61 is curved so as to be slightly project to the metal plate 20c' side. The distance D2 in the Z direction between the convex surface 61 and the concave surface 65 is the same as the distance D2 illustrated in FIG. 3. The concave surface 65 is curved so as to be slightly project to the side opposite to the metal plate 20c'. The side surface 63 is inclined between the convex surface 61 and the concave surface 65 away from the convex surface 61 in the +X direction. The side surface 67 is inclined between the concave surface 65 and the convex surface 61 away from the concave surface 65 in the +X direction.

The concave surface 51, the side surface 53, the convex surface 55, and the side surface 57 are respectively complementary to the convex surface 61, the side surface 63, the concave surface 65, and the side surface 67. The dies 50 and 60 are set beforehand such that the concave surface 51, the side surface 53, the convex surface 55, and the side surface 57 respectively face the convex surface 61, the side surface 63, the concave surface 65, and the side surface 67. Therefore, as illustrated in FIG. 5B, pressing the metal plate 20c' by the dies 50 and 60 causes the metal plate 20c to have the shape illustrated in FIG. 3. Additionally, FIG. 5B omits the reference numerals of the curved regions 22c, 24c, 26c, and 28c.

Figure 6A:
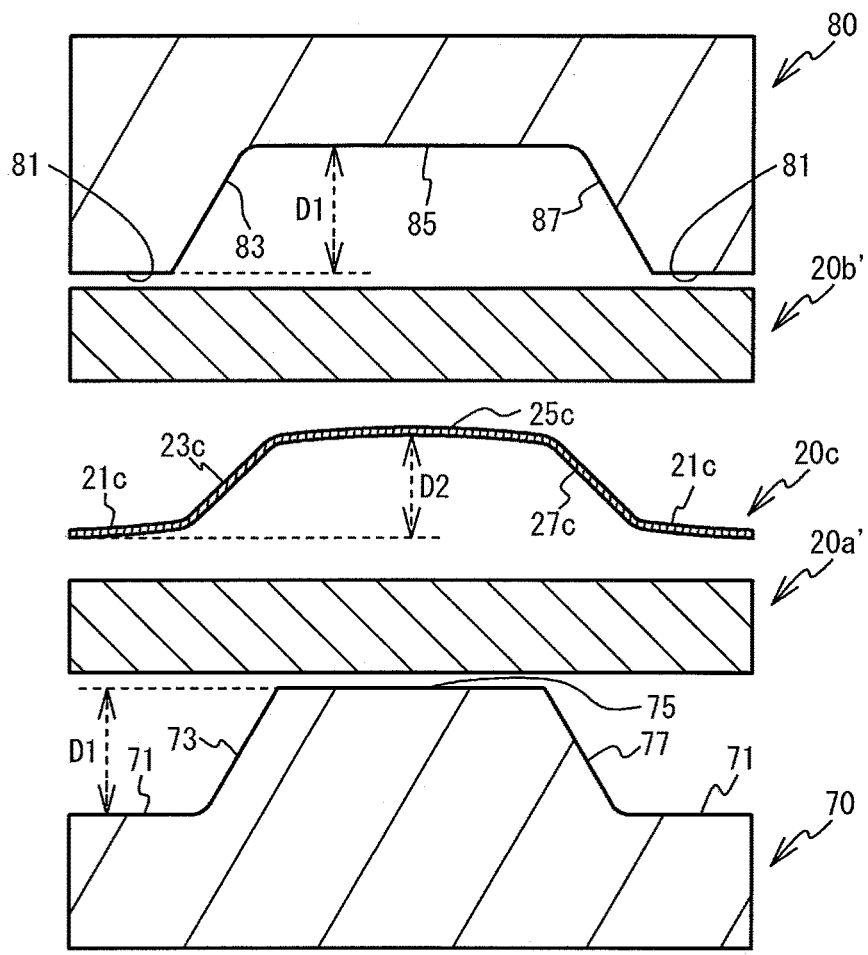
FIGS. 6A and 6B are explanatory views of the manufacturing method of the separator.
Figure 6B:
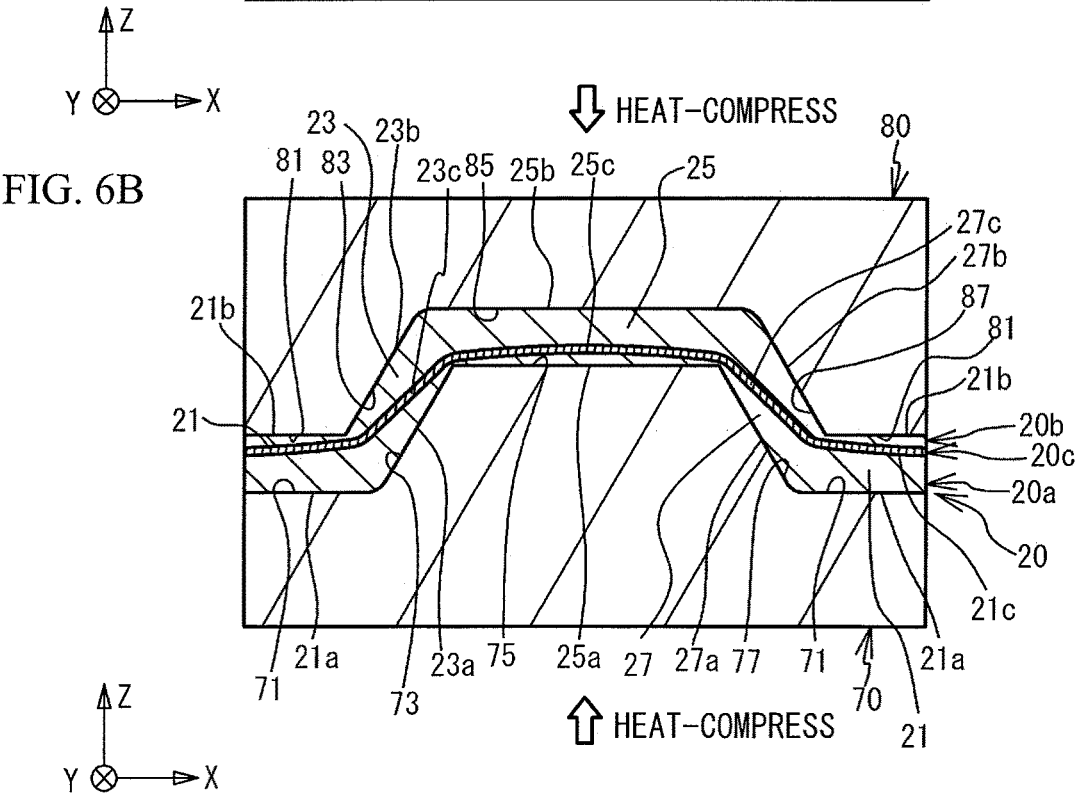

Next, resin sheets 20a' and 20b' are prepared (step S30). The resin sheets 20a' and 20b' respectively correspond to the resin layers 20a and 20b of the completed separator 20. As an example, when a thermosetting resin is used as the resin binder, the resin sheets 20a' and 20b' are heated to a temperature lower than the curing temperature of the thermosetting resin to be brought into a semi-cured state and to each have a sheet shape. Next, the resin sheets 20a' and 20b' and the metal plate 20c are heated and pressed by the dies 70 and 80, in a state where the metal plate 20c is set between the resin sheets 20a' and 20b' and the resin sheet 20a' is close to the die 70 and the resin sheet 20b' is close to the die 80 as illustrated in FIGS. 6A and 6B (step S40). FIGS. 6A and 6B also illustrate only parts of the dies 70 and 80, but actually the shapes illustrate in FIGS. 6A and 6B are continuously formed in the X direction.

Herein, a concave surface 71, a side surface 73, a convex surface 75, a side surface 77, a concave surface 71 . . . are formed at the resin sheet 20a' side of the die 70 in this order in the +X direction. The convex surface 75 projects to the resin sheet 20a' side from the concave surface 71, and the concave surface 71 recedes away from the resin sheet 20a' as compared with the convex surface 75. The concave surface 71 and the convex surface 75 are flat and substantially parallel to each other in the X direction. The distance D1 between the concave surface 71 and the convex surface 75 in the Z direction is the same as the distance D1 illustrated in FIG. 3, and is set longer than the distance D2. The side surface 73 is inclined between the concave surface 71 and the convex surface 75 away from the concave surface 71 in the +X direction. The side surface 77 is inclined and positioned between the convex surface 75 and the concave surface 71 away from the convex surface 75 in the +X direction.

A convex surface 81, a side surface 83, a concave surface 85, a side surface 87, a convex surface 81 . . . are formed on the resin sheet 20b' side of the die 80 in this order in the +X direction. The concave surface 85 is spaced away from the resin sheet 20b' as compared with the convex surface 81, and the convex surface 81 projects to the resin sheet 20b' from the concave surface 85. The convex surface 81 and the concave surface 85 are flat and substantially parallel to each other in the X direction. The distance D1 between the convex surface 81 and the concave surface 85 in the Z direction is the same as the distance D1 illustrated in FIG. 3, and is set longer than the distance D2. The side surface 83 is inclined between the convex surface 81 and the concave surface 85 away from the convex surface 81 in the +X direction. The side surface 87 is inclined between the concave surface 85 and the convex surface 81 away from the concave surface 85 in the +X direction.

The concave surface 71, the side surface 73, the convex surface 75, and the side surface 77 are respectively complementary to the convex surface 81, the side surface 83, the concave surface 85, and the side surface 87. The dies 70 and 80 are set beforehand such that the concave surface 71, the side surface 73, the convex surface 75, and the side surface 77 respectively face the convex surface 81, the side surface 83, the concave surface 85, and the side surface 87.

In addition, the gradient with respect to the X direction is set to be steeper on each of the side surfaces 73 and 83 than on each of the side surfaces 53 and 63 described above. The gradient with respect to the X direction is set to be steeper on each of the side surfaces 77 and 87 than on each of the side surfaces 57 and 67. That is, the gradient with respect to the X direction is steeper on each of the side surfaces 73 and 83 than on the side region 23c of the metal plate 20c, and is steeper on each of the side surfaces 77 and 87 than on the side region 27c.

The resin sheets 20a' and 20b' and the metal plate 20c between the dies 70 and 80 are set such that the convex region 21c, the side region 23c, the convex region 25c, and the side region 27c of the metal plate 20c respectively face the concave surface 71, the side surface 73, the convex surface 75, and the side surface 77 of the die 70 through the resin sheet 20a' and that the convex region 21c, the side region 23c, the convex region 25c, the convex region 25c, and the side regions 27c of the metal plate 20c respectively face the convex surface 81, the side surface 83, the concave surface 85, and the side surface 87 of the die 80 through the resin sheet 20b'.

In consideration of the viscosity of the resin sheets 20a' and 20b' in the hot pressing, the heating temperature of the resin sheets 20a' and 20b' is adjusted so as to each have a desired shape before the resin sheets 20a' and 20b' are completely thermally cured. In the hot pressing, the resin sheet 20a' is compressed between the die 70 and the metal plate 20c.

In the hot pressing, the resin sheet 20a' is pressed to the metal plate 20c by the convex surface 75 and is pressed to the die 70 by the convex region 21c away from the convex surface 75 in the X direction. At this time, the resin sheets 20a' and 20b' are semi-cured as described above and are sufficiently softer than the metal plate 20c. Therefore, the resin sheet 20a' is curved along and between the die 70 and the metal plate 20c by pressing without substantially deforming the metal plate 20c. Likewise, the resin sheet 20b' is pressed to the metal plate 20c by the convex surface 81 and is pressed to the die 80 by the convex region 25c away from the convex surface 81 in the X direction. As a result, the resin sheet 20b' is curved along and between the die 80 and the metal plate 20c.

When the die 70 and the metal plate 20c are further close to each other, a gap between the convex surface 75 and the convex region 25c in the Z direction is made narrow before a gap between the concave surface 71 and the convex region 21c in the Z direction is made narrow, and a part of the resin sheet 20a' is preferentially compressed by the convex surface 75 and the convex region 25c. A part of the compressed resin sheet 20a' flows to a large gap between the concave surface 71 and the convex region 21c in the −X direction from the convex surface 75 through a gap between the side surface 73 and the side region 23c, and flows to a large gap between the concave surface 71 and the convex region 21c in the +X direction from the convex surface 75 through a gap between the side surface 77 and the side regions 27c. This makes a thin portion between the convex surface 75 and the convex region 25c of the resin sheet 20a', and a thick portion between the concave surface 71 and the convex region 21c of the resin sheet 20a'.

Similarly, when the die 80 and the metal plate 20c are further close to each other, a gap between the convex surface 81 and the convex region 21c in the Z direction is made narrower before a gap between the concave surface 85 and the convex region 25c in the Z direction, and a part of the resin sheet 20b' is preferentially compressed by the convex surface 81 and the convex region 21c. The compressed part of the resin sheet 20b' flows to a large gap between the concave surface 85 and the convex region 25c through a gap between the side surface 83 and the side region 23c in the +X direction, and flows to a large gap between the concave surface 85 and the convex region 25c through a gap between the side surface 87 and the side region 27c. This makes a thin portion between the convex surface 81 and the convex region 21c of the resin sheet 20b', and a thick portion between the concave surface 85 and the convex region 25c of the resin sheet 20b'.

In this manner, the resin sheets 20a' and 20b' are deformed and compressed to form the resin layers 20a and 20b illustrated in FIG. 6B, which forms the flow channels 20A and 20B. Also, the viscosity of the resin binder of the resin sheets 20a' and 20b' and the heat temperature thereof are adjusted beforehand such that the resin sheets 20a' and 20b' partially flow so as to form the resin layers 20a and 20b by hot pressing. In addition, since the resin sheets 20a' and 20b' are compressed by hot pressing, the total thickness of the resin layers 20a and 20b after hot pressing is less than the total thickness of the resin sheets 20a' and 20b' before hot pressing.

After the flow channels 20A and 20B are formed, holes are formed in the integrated resin layers 20a and 20b and the metal plate 20c to form the holes c1 to c6 illustrated in FIG. 1 (Step S50). In such a manner, the separator 20 is manufactured. The separator 40 is also manufactured by the same method. As for the above manufacturing method, steps S10 and S20 may be executed after step S30, or step S20 may be executed after steps S10 and S30.

Figure 7:
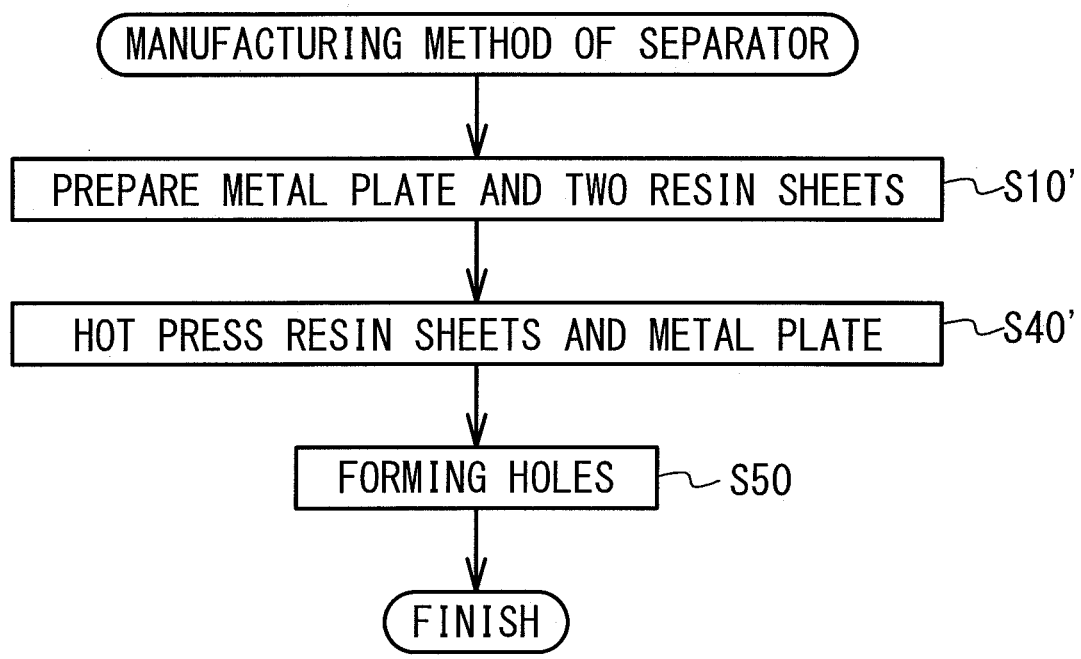
FIG. 7 is a flowchart illustrating a variation of the manufacturing method of the separator.
Figure 8A:
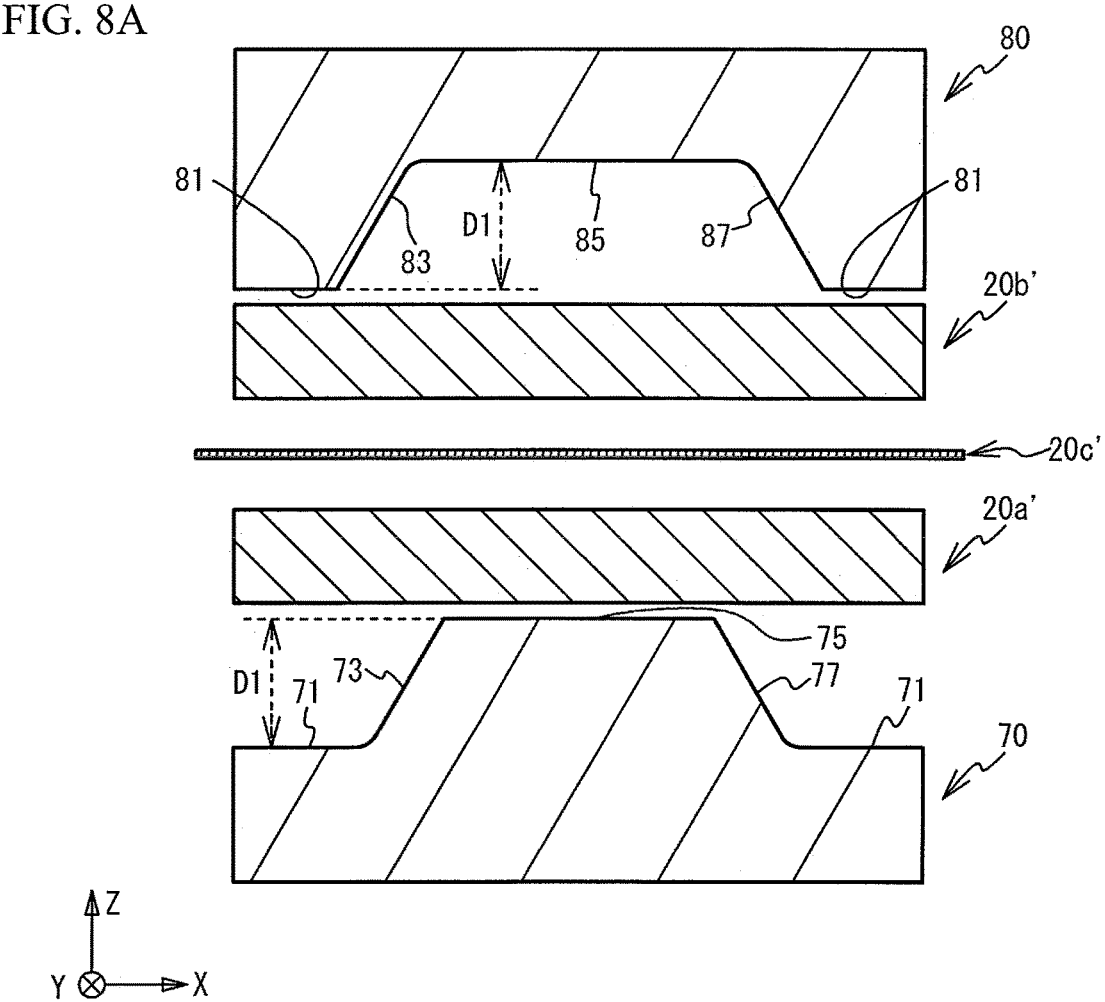
FIGS. 8A and 8B are explanatory views of a variation of the manufacturing method of the separator.
Figure 8B:
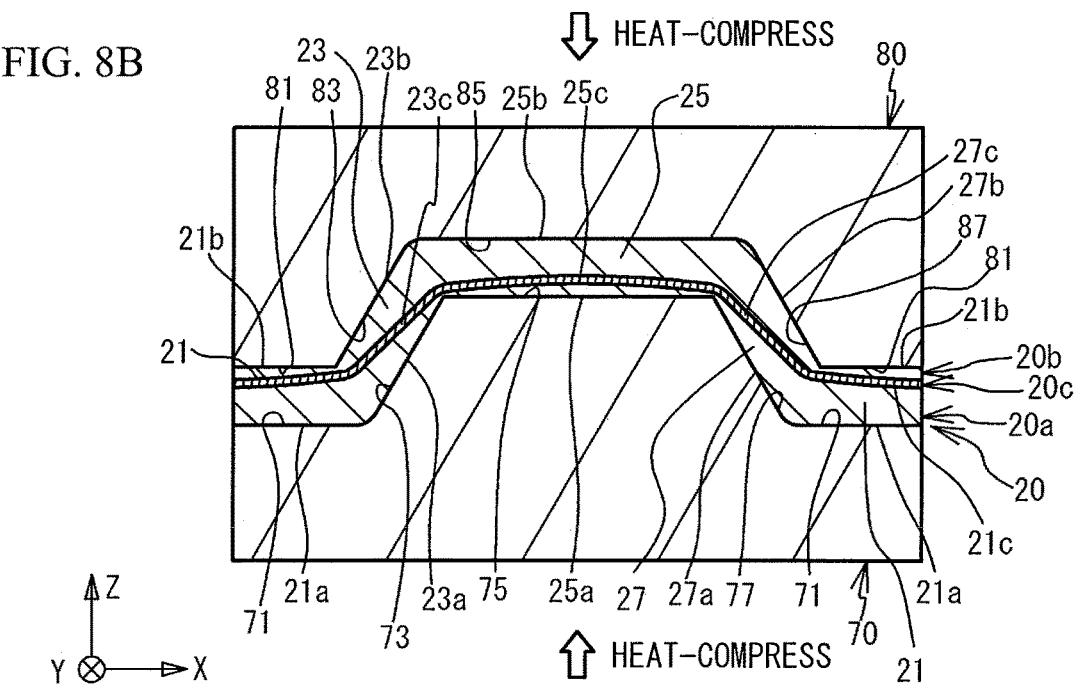

Next, a variation of the manufacturing method of the separator 20 will be described. FIG. 7 is a flowchart illustrating the variation of the manufacturing method of the separator 20. FIGS. 8A and 8B are explanatory views of the variation of the manufacturing method of the separator 20. First, the above described flat metal plate 20c' and the resin sheets 20a' and 20b' are prepared (step S10'). Next, as illustrated in FIGS. 8A and 8B, the metal plate 20c' is set between the resin sheets 20a' and 20b' such that the resin sheet 20a' is close to the die 70 and that the resin sheet 20b' is close to the die 80, and the resin sheets 20a' and 20b' and the metal plate 20c' are set between the dies 70 and 80 and are heated and pressed thereby (step S40').

When compression starts, the convex surface 75 presses the resin sheet 20a' to the die 80 in the state where the resin sheets 20a' and 20b' and the metal plate 20c' are laminated. The convex surface 81 presses the resin sheet 20b' to the die 70. The resin sheets 20a' and 20b' and the metal plate 20c' are integrally curved along the shapes of the dies 70 and 80. Further, when the dies 70 and 80 are further close to each other, the resin sheets 20a' and 20b' are respectively deformed along the shapes of the dies 70 and 80, because the resin sheets 20a' and 20b' are more deformable than the metal plate 20c'. However, the deformation amount of the metal plate 20c' is smaller than each deformation amount of the resin sheets 20a' and 20b'. For this reason, as illustrated in FIG. 8B, the metal plate 20c' is deformed between the dies 70 and 80 such that the deformation amount is as small as possible. As a result, the metal plate 20c' has substantially the same shape as that of the metal plate 20c illustrated in FIG. 3. Further, the resin sheets 20a' and 20b' are deformed and compressed to form the resin layers 20a and 20b as illustrated in FIG. 6B. Next, holes are formed in the integrated resin layers 20a and 20b and the metal plate 20c to form the holes c1 to c6 (step S50). In the variation, the deformation amount of the metal plate 20c' can be adjusted by changing each viscosity of the resin sheets 20a' and 20b'. The relatively low viscosity of the resin sheets 20a' and 20b' causes a small deformation amount of the metal plate 20c'. The relatively high viscosity of the resin sheets 20a' and 20b' causes a large deformation amount of the metal plate 20c'.

In the variation of the manufacturing method, the flow channels 20A and 20B can be formed by hot pressing the resin sheets 20a' and 20b' and the flat plate-shaped metal plate 20c' once. Thus, the manufacturing method is simplified. In order to improve the joining force between the resin sheets 20a' and 20b' and the metal plate 20c', undercoat paint may be applied beforehand on both surfaces of the metal plate 20c' before the pressing. This can ensue the stiffness of the completed separator 20. In addition, the surface portions of the resin sheets 20a' and 20b' may be previously joined to the metal plate 20c' before the pressing. This facilitates handling the metal plate 20c' and the resin sheets 20a' and 20b' in the pressing.

The manufacturing method of the separator 20 is not limited to the above. For example, the metal plate 20c' and the resin sheets 20a' and 20b' may be separately pressed to form the metal plate 20c and the resin layers 20a and 20b, after that, the resin layers 20a and 20b may be joined to the metal plate 20c. In this case, the resin layer 20a is formed by pressing the resin sheet 20a' by use of the die 70 and a die having substantially the same shape as the metal plate 20c, and the resin layer 20b is formed by pressing the resin sheet 20b' by use of the die 80a and a die having substantially the same shape as the metal plate 20c.

The above manufacturing method have described the thermosetting resin as an example of the resin binders of the resin sheets 20a' and 20b'. In the case of the thermoplastic resin as the resin binder, the resin sheet is heated to a certain temperature to be brought into a semi-cured state before the hot press, and the resin sheet is pressed and heated to a temperature at which the viscosity does not decrease too much, and then the resin sheet may be cooled.

The above unit cell 2 of the fuel cell 1 uses the separator 20 in which the resin layers 20a and 20b are formed on both surfaces of the metal plate 20c, and the separator 40 in which the resin layers 40a and 40b are formed on both surfaces of the metal plate 40c. However, the present invention is not limited to this. For example, instead of one of the separators 20 and 40, a separator of only metal plate may be used.

In the above embodiment of the metal plate 20c, the convex region 21c is curved so as to slightly project to the surface 20c1, and the convex region 25c is curved so as to slightly project to the surface 20c2. However, the present invention is not limited to this. The convex regions 21c and 25c may be substantially parallel to the convex surface 21a, the concave surface 21b, the concave surface 25a, and the convex surface 25b.

The above described separator 20 is used for the water-cooling fuel cell 1 using a liquid as a cooling medium. However, the present invention is not limited to this. It may be used in an air-cooling fuel cell using air as a cooling medium.

Although some embodiments of the present invention have been described in detail, the present invention is not limited to the specific embodiments but may be varied or changed within the scope of the present invention as claimed.

What is claimed is:

1. A separator for a fuel cell, comprising:
a metal plate;
a first electro-conductive resin layer formed on a first surface side of the metal plate;
a second electro-conductive resin layer formed on a second surface side of the metal plate opposite to the first surface side; and
a wavy portion defining a flow channel in which the metal plate and the first and second electro-conductive resin layers have a wavy shape in cross section,
wherein
the wavy portion includes:
a first convex portion projecting to the first surface side;
a second convex portion projecting to the second surface side as compared with the first convex portion;
a side portion positioned between the first and second convex portions;
a first outer surface of the first electro-conductive resin layer opposite to the metal plate;
a second outer surface of the second electro-conductive resin layer opposite to the metal plate;
a first curved portion curved between the side portion and the first convex portion; and
a second curved portion curved between the side portion and the second convex portion,
the first convex portion of the metal plate is closer to the second outer surface than the first outer surface,
the second convex portion of the metal plate is closer to the first outer surface than the second outer surface,
in the first convex portion, the metal plate is curved to project toward the first outer surface,
in the second convex portion, the metal plate is curved to project toward the second outer surface,
the first convex portion of the metal plate is distant from the first outer surface by a thickness of the metal plate or more,
the second convex portion of the metal plate is distant from the second outer surface by the thickness of the metal plate or more,
in the first curved portion, a curvature of the metal plate is smaller than that of the first outer surface,
in the second curved portion, a curvature of the metal plate is smaller than that of the second outer surface,
an average thickness of the second electro-conductive resin layer in the first convex portion is equal to or less than 40 percent of a total value of an average thickness of the first electro-conductive resin layer in the first convex portion and an average thickness of the second electro-conductive resin layer in the first convex portion,
an average thickness of the first electro-conductive resin layer in the second convex portion is equal to or less than 40 percent of a total value of an average thickness of the first electro-conductive resin layer in the second convex portion and an average thickness of the second electro-conductive resin layer in the second convex portion, and
a ratio of the thickness of the metal plate to a total thickness of the metal plate and the first and second electro-conductive resin layers is equal to or less than 50 percent.

2. The separator for the fuel cell of claim 1, wherein
a shape of the first outer surface in the first convex portion is flat, and
a shape of the second outer surface in the second convex portion is flat.

3. The separator for the fuel cell of claim 1, wherein a ratio of a distance, from the metal plate in the second convex portion to the metal plate in the first convex portion in a thickness direction, to a distance, from the first outer surface in the second convex portion to the first outer surface in the first convex portion, is equal to or less than 95 percent.

4. A fuel cell comprising:
first and second separators; and
a membrane electrode gas diffusion layer assembly positioned between the first and second separators,
wherein
at least one of the first and second separators includes:
  a metal plate;
  a first electro-conductive resin layer formed on a first surface side of the metal plate;
  a second electro-conductive resin layer formed on a second surface side of the metal plate opposite to the first surface side; and
  a wavy portion defining a flow channel in which the metal plate and the first and second electro-conductive resin layers have a wavy shape in cross section,
the wavy portion includes:
  a first convex portion projecting to the first surface side;
  a second convex portion projecting to the second surface side as compared with the first convex portion;
  a side portion positioned between the first and second convex portions;
  a first outer surface of the first electro-conductive resin layer opposite to the metal plate;
  a second outer surface of the second electro-conductive resin layer opposite to the metal plate;
  a first curved portion curved between the side portion and the first convex portion; and
  a second curved portion curved between the side portion and the second convex portion,
the first convex portion of the metal plate is closer to the second outer surface than the first outer surface,
the second convex portion of the metal plate is closer to the first outer surface than the second outer surface,
in the first convex portion, the metal plate is curved to project toward the first outer surface,
in the second convex portion, the metal plate is curved to project toward the second outer surface,
the first convex portion of the metal plate is distant from the first outer surface by a thickness of the metal plate or more,
the second convex portion of the metal plate is distant from the second outer surface by the thickness of the metal plate or more,
in the first curved portion, a curvature of the metal plate is smaller than that of the first outer surface,
in the second curved portion, a curvature of the metal plate is smaller than that of the second outer surface,
an average thickness of the second electro-conductive resin layer in the first convex portion is equal to or less than 40 percent of a total value of an average thickness of the first electro-conductive resin layer in the first convex portion and an average thickness of the second electro-conductive resin layer in the first convex portion,
an average thickness of the first electro-conductive resin layer in the second convex portion is equal to or less than 40 percent of a total value of an average thickness of the first electro-conductive resin layer in the second convex portion and an average thickness of the second electro-conductive resin layer in the second convex portion, and
a ratio of the thickness of the metal plate to a total thickness of the metal plate and the first and second electro-conductive resin layers is equal to or less than 50 percent.

5. A manufacturing method of a separator for a fuel cell, comprising:
preparing a metal plate, a first electro-conductive resin layer, and a second electro-conductive resin layer;
forming a wavy portion by pressing the metal plate and the first and second electro-conductive resin layers,
wherein
the first electro-conductive resin layer is formed on a first surface side of the metal plate;
the second electro-conductive resin layer is formed on a second surface side of the metal plate opposite to the first surface side;
the wavy portion defines a flow channel in which the metal plate and the first and second electro-conductive resin layers have a wavy shape in cross section;
the wavy portion includes:
  a first convex portion projecting to the first surface side;
  a second convex portion projecting to the second surface side as compared with the first convex portion;
  a side portion positioned between the first and second convex portions;
  a first outer surface of the first electro-conductive resin layer opposite to the metal plate;
  a second outer surface of the second electro-conductive resin layer opposite to the metal plate;
  a first curved portion curved between the side portion and the first convex portion; and
  a second curved portion curved between the side portion and the second convex portion;
the first convex portion of the metal plate is closer to the second outer surface than the first outer surface;
the second convex portion of the metal plate is closer to the first outer surface than the second outer surface;
in the first convex portion, the metal plate is curved to project toward the first outer surface;
in the second convex portion, the metal plate is curved to project toward the second outer surface;
the first convex portion of the metal plate is distant from the first outer surface by a thickness of the metal plate or more;
the second convex portion of the metal plate is distant from the second outer surface by the thickness of the metal plate or more;
in the first curved portion, a curvature of the metal plate is smaller than that of the first outer surface;
in the second curved portion, a curvature of the metal plate is smaller than that of the second outer surface;
an average thickness of the second electro-conductive resin layer in the first convex portion is equal to or less than 40 percent of a total value of an average thickness of the first electro-conductive resin layer in the first convex portion and an average thickness of the second electro-conductive resin layer in the first convex portion;
an average thickness of the first electro-conductive resin layer in the second convex portion is equal to or less than 40 percent of a total value of an average thickness of the first electro-conductive resin layer in the second convex portion and an average thickness of the second electro-conductive resin layer in the second convex portion; and a ratio of the thickness of the metal plate to a total thickness of the metal plate and the first and second electro-conductive resin layers is equal to or less than 50 percent.

* * * * *